No. 647,096. Patented Apr. 10, 1900.
X. O. HOWE.
MIRROR.
(Application filed Apr. 16, 1898.)
(No Model.)
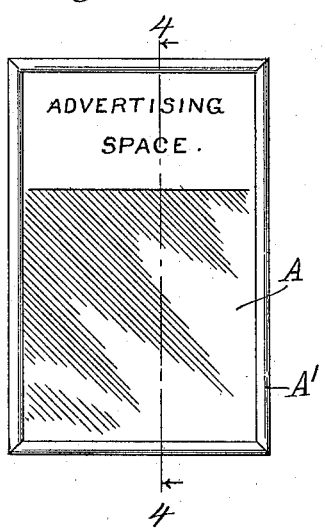
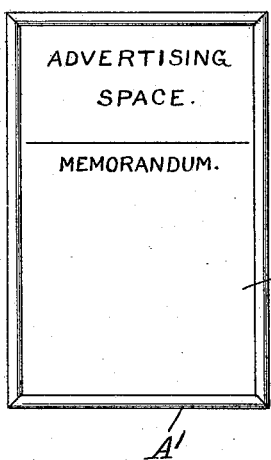
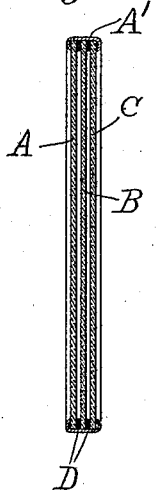
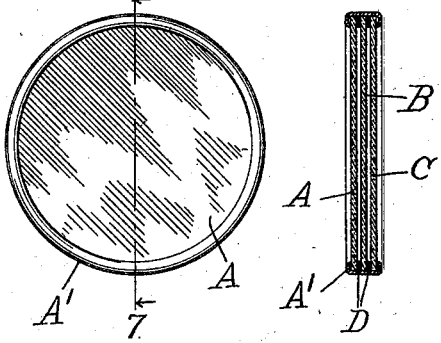
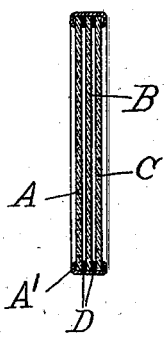
Witnesses.
Edward T. Wray.
Harry B. White.
Inventor.
Xenophon O. Howe.

UNITED STATES PATENT OFFICE.

XENOPHON O. HOWE, OF CHICAGO, ILLINOIS.

MIRROR.

SPECIFICATION forming part of Letters Patent No. 647,096, dated April 10, 1900.

Application filed April 16, 1898. Serial No. 677,798. (No model.)

*To all whom it may concern:*

Be it known that I, XENOPHON O. HOWE, a citizen of the United States, residing at Chicago, in the county of Cook and State of Illinois, have invented a certain new and useful Improvement in Mirrors, of which the following is a specification.

My invention relates to mirrors, and has for its object to provide a new and improved mirror, of which the following is a description, reference being had to the accompanying drawings, wherein—

Figure 1 is a view of a device embodying my invention. Fig. 2 is a view of the reverse side of Fig. 1. Fig. 3 is a view of a plate carrying a design. Fig. 4 is a section on line 4 4, Fig. 1. Fig. 5 is a view of the device when held up to the light. Fig. 6 is a view showing a different construction. Fig. 7 is a section on line 7 7, Fig. 6.

Like letters refer to like parts throughout the several figures.

I have illustrated in the drawings some simple constructions embodying my invention; but it is of course evident that the invention may be utilized in many other ways than herein illustrated.

Referring now to the drawings, I have illustrated in Figs. 1 to 5, inclusive, a device particularly adapted for advertising purposes. This device consists of a mirror-plate A, mounted in a suitable frame A'. In the manufacture of this mirror-plate the opaque backing usually applied to the mirror is omitted, so that the mirror will transmit light if held up between the eye and the light. Such constructions may be readily made by covering the deposit of silver on the mirror-plate with some suitable transparent coating—as, for example, shellac or the like. It is of course evident that any means may be used to produce this result, and I do not limit myself in any manner in the construction of this mirror-plate. Associated with this mirror-plate is some suitable design or picture adapted to be exposed to view when the mirror is held up between the light and the eye of the observer. This design may be of any suitable description and may be associated with the mirror in any desired manner. For example, the design or picture may be placed directly upon the back of the mirror or it may be associated with a plate B, in proximity to the mirror-plate A. A plate C, of some material adapted to transmit light, is also held in the frame A', the design-plate B being preferably intermediate or between the plates A and C. This plate C, as illustrated in Figs. 1 to 5, is made of some material adapted to transmit light, but which is also adapted to allow memoranda to be written thereon and easily erased therefrom. Any suitable material for this purpose may be utilized—such, for example, as celluloid, ground glass, and the like. Interposed between the several plates are suitable cushions or washers D D, which separate the plates, so that small intervening air-spaces will be provided. If the design is attached directly to the mirror-plate, some suitable backing may be used, and I prefer to insert these washers between the mirror-plate and the backing. These washers may be of any suitable description and may be made in sections or may simply consist of small pieces interposed between the several plates. Any device or arrangement desired may be used which will produce the separation of the plates. I may place any suitable advertising matter on a portion of the plates B and C, as shown, for example, in Figs. 1 and 2. This advertising matter may be placed directly on the plates or any suitable construction may be used for associating the advertising matter with the mirror. When acting by reflected light as a mirror, the plate A reflects images of objects placed before it. If now the device is held up between the light and the observer's eye, the design associated with the mirror-plate will be brought into view. This design is ordinarily concealed when the device is acting as a mirror. Any suitable memoranda may be placed upon the plate C and erased therefrom, thus allowing the plate to be continuously used for different memoranda. By associating some advertising matter with the mirror it will be seen that it can be made up by people desiring to advertise and distributed among customers. The advertising matter is thus continuously presented to the notice of the person having possession of the device. The memorandum-plate is very useful, and the concealed image or design makes the device interesting and gives it value. It is of course evident that the design itself may be an advertisement, if desired, and that the advertising matter and the several parts may be arranged in accordance with any desired plan. The cushions or washers separate the several plates, so as to form air-spaces between the plates, insuring them against injury.

As illustrated in Figs. 6 and 7, I have shown the device with no external advertising matter, and in this construction the plate C is also a mirror, so that a double mirror is formed with an intermediate design.

It is of course evident that the device may be made up in any form and the arrangement and construction of the several parts may be greatly varied without departing from the spirit of my invention. I therefore do not wish to be limited to the construction shown.

I claim—

1. As an article of manufacture, a device comprising a mirror-plate and a design associated together, a suitable backing-plate adapted to transmit light associated with the mirror-plate, intervening separating devices between the plates so as to slightly separate them and provide intervening air-spaces, the device constituting a mirror when acting by reflected light, the design being brought into view when the device is acting by transmitted light.

2. As an article of manufacture, a device comprising a mirror-plate and a design associated together, a memorandum-plate associated with the mirror-plate, said memorandum-plate adapted to transmit light, the device constituting a mirror when acting by reflected light, the design being brought into view when the device is acting by transmitted light.

3. As an article of manufacture, a device comprising a mirror-plate and a design associated together, a memorandum-plate associated with the mirror-plate, said memorandum-plate adapted to transmit light, the device constituting a mirror when acting by reflected light, the design being brought into view when the device is acting by transmitted light, and a separating device or cushion between the several plates.

4. As an article of manufacture, a device comprising two mirror-plates placed back to back, an intermediate plate of material adapted to transmit light and carrying a suitable design, a frame around the outer edge of said plates which holds them together, a separating device between the edges of the several plates and constructed so as to leave the central part of the device free, said device constituting a mirror when acting by reflected light, the design being brought into view when the device is acting by transmitted light.

5. As an article of manufacture, an advertising device, comprising a mirror-plate and a design associated together, an advertisement associated with said mirror-plate and exposed to view, a memorandum-plate associated with said mirror-plate and made of material adapted to transmit light, the device constituting a mirror when acting by reflected light, the design being brought into view when the device is acting by transmitted light.

6. As an article of manufacture, an advertising device, comprising a mirror-plate, a memorandum-plate made of material adapted to transmit light associated with said mirror-plate, an intermediate design-plate carrying a suitable design, and a frame in which said several plates are contained, the device constituting a mirror when acting by reflected light, the design being brought into view when the device is acting by transmitted light.

7. As an article of manufacture, a device consisting of two mirror-plates placed back to back, an intermediate plate of material adapted to transmit light and carrying a suitable design, a frame around the outer edge of said plates which holds them together, the frame constructed so as to leave the two mirror-surfaces on each side of the device free, a washer inserted between each mirror and the intermediate plate, said washer cut away at the center so as not to obstruct the design on the plate, the whole so arranged that when the device is used as a mirror the design is ordinarily concealed, said design adapted to be brought into view by changing the position of the mirror with relation to the observer's eye, so that it will act by transmitted light instead of reflected light.

XENOPHON O. HOWE.

Witnesses:
DONALD M. CARTER,
HOMER L. KRAFT.